United States Patent
Gray et al.

(10) Patent No.: US 10,656,866 B2
(45) Date of Patent: May 19, 2020

(54) UNIDIRECTIONAL VAULT SYNCHRONIZATION TO SUPPORT TIERING

(71) Applicant: International Business Machines Corporation, Armonk, NY (US)

(72) Inventors: Adam M. Gray, Chicago, IL (US); Greg R. Dhuse, Chicago, IL (US); Andrew D. Baptist, Mt. Pleasant, WI (US); Ravi V. Khadiwala, Bartlett, IL (US); Wesley B. Leggette, Chicago, IL (US); Scott M. Horan, Clarendon Hills, IL (US); Franco V. Borich, Naperville, IL (US); Bart R. Cilfone, Marina del Ray, CA (US); Daniel J. Scholl, Chicago, IL (US); Kumar Abhijeet, Chicago, IL (US); Praveen Viraraghavan, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

(21) Appl. No.: 15/843,978

(22) Filed: Dec. 15, 2017

(65) Prior Publication Data

US 2018/0107397 A1 Apr. 19, 2018

Related U.S. Application Data (63) Continuation-in-part of application No. 14/926,891, filed on Oct. 29, 2015, now Pat. No. 10,126,974.
(Continued)

(51) Int. Cl.
*G06F 12/00* (2006.01)
*G06F 12/08* (2016.01)
(Continued)

(52) U.S. Cl.
CPC .............. *G06F 3/065* (2013.01); *G06F 3/064* (2013.01); *G06F 3/067* (2013.01); *G06F 3/0619* (2013.01); *G06F 11/1076* (2013.01)

(58) Field of Classification Search
CPC ....................................................... G06F 3/065
(Continued)

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Chung; An Automatic Data Segmentation Method for 3D Measured Data Points; National Taiwan University; pp. 1-8; 1998.
(Continued)

*Primary Examiner* — Mohamed M Gebril
(74) *Attorney, Agent, or Firm* — Garlick & Markison; Timothy W. Markison; Kelly H. Hale (57) ABSTRACT

A computing device includes an interface configured to interface and communicate with a dispersed storage network (DSN), a memory that stores operational instructions, and processing circuitry operably coupled to the interface and to the memory. The processing circuitry is configured to execute the operational instructions to perform various operations and functions. The computing device selects storage parameters for a multi-vault synchronization process from a first storage vault to a second storage vault. The computing device synchronizes storage of the set(s) of ingestion encoded data slices (EDSs) between the vaults and maintains storage of a portion of an ingestion data stream within the second storage vault. The computing device facilitates deletion of the set(s) of ingestion EDSs corresponding to the portion of an ingestion data stream from the first storage vault. the computing device performs additional
(Continued)

multi-vault synchronization process(es) for any other portion(s) of the ingestion data stream.

20 Claims, 7 Drawing Sheets

Related U.S. Application Data (60) Provisional application No. 62/098,414, filed on Dec. 31, 2014.

(51) Int. Cl.
*G06F 13/00* (2006.01)
*G06F 3/06* (2006.01)
*G06F 11/10* (2006.01)

(58) Field of Classification Search
USPC ........................................................ 711/172
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,595,435 B2 * | 11/2013 | Cilfone | G06F 11/1076 711/114 |
| 8,880,801 B1 * | 11/2014 | Robins | G06F 12/0246 711/114 |
| 9,462,316 B2 * | 10/2016 | Gladwin | G06F 21/10 |
| 9,571,570 B1 * | 2/2017 | Mutnuru | H04L 67/1023 |
| 9,621,427 B1 * | 4/2017 | Shah | G06F 9/45533 |
| 9,774,684 B2 * | 9/2017 | Dhuse | G06F 11/1092 |
| 9,846,540 B1 * | 12/2017 | Franklin | G06F 3/065 |
| 9,858,006 B1 * | 1/2018 | Wu | G06F 3/0635 |
| 10,216,757 B1 * | 2/2019 | Armangau | G06F 16/178 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2003/0126387 A1 * | 7/2003 | Watanabe | G06F 11/2058 711/161 |
| 2004/0024963 A1 | 2/2004 | Talagala et al. | |
| 2004/0098545 A1 * | 5/2004 | Pline | G06F 13/1684 711/154 |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2005/0283649 A1 * | 12/2005 | Turner | H04L 67/1095 714/6.12 |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0078901 A1 * | 4/2007 | Satou | G06F 3/0605 |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2007/0299887 A1 * | 12/2007 | Novik | G06F 16/273 |
| 2009/0094251 A1 | 4/2009 | Gladwin et al. | |
| 2009/0094318 A1 | 4/2009 | Gladwin et al. | |
| 2009/0217056 A1 * | 8/2009 | Malpani | G06F 21/34 713/193 |
| 2010/0023524 A1 | 1/2010 | Gladwin et al. | |
| 2010/0094955 A1 * | 4/2010 | Zuckerman | H04L 67/1097 709/219 |
| 2010/0153638 A1 * | 6/2010 | Yochai | G06F 11/2092 711/113 |
| 2010/0235321 A1 * | 9/2010 | Shukla | H04L 67/10 707/610 |
| 2011/0029711 A1 * | 2/2011 | Dhuse | G06F 11/1076 711/4 |
| 2011/0029731 A1 * | 2/2011 | Cilfone | G06F 11/1076 711/114 |
| 2011/0029809 A1 * | 2/2011 | Dhuse | G06F 11/1076 714/6.1 |
| 2011/0071988 A1 * | 3/2011 | Resch | G06F 11/1076 707/691 |
| 2011/0072210 A1 * | 3/2011 | Dhuse | G06F 11/1076 711/114 |
| 2011/0072321 A1 * | 3/2011 | Dhuse | G06F 11/1076 714/55 |
| 2011/0078373 A1 * | 3/2011 | Hoffman | G06F 11/10 711/114 |
| 2011/0106904 A1 * | 5/2011 | Resch | G06F 11/1076 709/207 |
| 2011/0125999 A1 * | 5/2011 | Cilfone | G06F 3/0617 713/150 |
| 2011/0161666 A1 * | 6/2011 | Gladwin | G06F 21/10 713/164 |
| 2011/0184997 A1 * | 7/2011 | Grube | G06F 16/182 707/827 |
| 2011/0185141 A1 * | 7/2011 | Dhuse | H04L 67/1097 711/165 |

(56) References Cited

U.S. PATENT DOCUMENTS

| | | | | |
|---|---|---|---|---|
| 2011/0225362 A1* | 9/2011 | Leggette | ............. | G06F 12/1425 711/114 |
| 2011/0225386 A1* | 9/2011 | Motwani | ............. | G06F 16/122 711/173 |
| 2011/0228931 A1* | 9/2011 | Grube | ................ | G06F 11/1076 380/201 |
| 2011/0276744 A1* | 11/2011 | Sengupta | ........... | G06F 12/0866 711/103 |
| 2011/0295796 A1* | 12/2011 | Muhunthan | ............ | G06F 16/27 707/610 |
| 2012/0089809 A1* | 4/2012 | Resch | .................. | G06F 12/023 711/206 |
| 2012/0102316 A1* | 4/2012 | Resch | ................. | G06F 11/1076 713/150 |
| 2012/0117351 A1* | 5/2012 | Motwani | ............. | G06F 3/0614 711/165 |
| 2012/0137091 A1* | 5/2012 | Grube | ................ | G06F 12/0638 711/158 |
| 2012/0163596 A1* | 6/2012 | Grube | .................... | G06F 21/62 380/252 |
| 2012/0166757 A1* | 6/2012 | Volvovski | ........... | G06F 11/1076 711/206 |
| 2012/0198197 A1* | 8/2012 | Gladwin | ............. | G06F 16/1727 711/170 |
| 2012/0221611 A1* | 8/2012 | Watanabe | ............. | G06F 3/0608 707/827 |
| 2012/0311068 A1* | 12/2012 | Gladwin | ............... | H04L 65/602 709/214 |
| 2013/0198130 A1* | 8/2013 | Resch | .................... | G06F 11/08 707/609 |
| 2013/0232307 A1* | 9/2013 | Clifone | ............... | G06F 11/1076 711/154 |
| 2013/0238900 A1* | 9/2013 | Leggette | ............. | G06F 11/2069 713/165 |
| 2013/0275545 A1* | 10/2013 | Baptist | ............. | H04L 29/08549 709/215 |
| 2013/0326264 A1* | 12/2013 | Resch | ................ | G06F 11/1088 714/6.2 |
| 2013/0339316 A1* | 12/2013 | Hirsch | .................. | G06F 3/0641 707/692 |
| 2013/0339420 A1* | 12/2013 | Srinivasan | ........ | H04L 29/08072 709/203 |
| 2013/0346716 A1* | 12/2013 | Resch | .................... | G06F 3/0619 711/162 |
| 2013/0346795 A1* | 12/2013 | Gladwin | ............. | G06F 12/1458 714/6.22 |
| 2014/0068259 A1* | 3/2014 | Resch | ................ | G06F 11/1076 713/167 |
| 2014/0074786 A1* | 3/2014 | Leggette | ............... | G06F 3/0689 707/638 |
| 2014/0195875 A1* | 7/2014 | Resch | ................ | G06F 11/1092 714/763 |
| 2014/0236913 A1* | 8/2014 | Chakradhar | ........ | G06F 16/2343 707/703 |
| 2014/0281804 A1* | 9/2014 | Resch | ....................... | G06F 8/65 714/763 |
| 2014/0281817 A1* | 9/2014 | Grube | ................ | G06F 11/1076 714/769 |
| 2014/0325157 A1* | 10/2014 | Sangapu | ................. | G06F 3/061 711/126 |
| 2014/0330923 A1* | 11/2014 | Baptist | ................ | G06F 11/1076 709/213 |
| 2014/0344227 A1* | 11/2014 | Grube | ................ | G06F 11/1666 707/691 |
| 2014/0344617 A1* | 11/2014 | Resch | ................ | G06F 11/1088 714/6.31 |
| 2014/0351457 A1* | 11/2014 | Baptist | ................. | G06F 3/0659 710/5 |
| 2015/0002522 A1* | 1/2015 | Nalluri | .................... | G06T 1/60 345/522 |
| 2015/0006780 A1* | 1/2015 | Shao | .................... | G06F 13/4027 710/316 |
| 2015/0113326 A1* | 4/2015 | Talagala | .............. | G06F 11/1441 714/24 |
| 2015/0347440 A1* | 12/2015 | Habouzit | ............ | G06F 16/1734 707/824 |
| 2016/0070652 A1* | 3/2016 | Sundararaman | ...... | G06F 3/0619 711/154 |
| 2016/0188253 A1* | 6/2016 | Resch | .................. | G06F 3/0647 711/172 |
| 2017/0153942 A1* | 6/2017 | Cabral | .................... | G06F 3/064 |
| 2017/0353580 A1* | 12/2017 | Horan | .................. | H04L 67/1097 |
| 2018/0107397 A1* | 4/2018 | Gray | ........................ | G06F 3/065 |
| 2018/0107431 A1* | 4/2018 | Resch | .................... | G06F 3/0659 |
| 2018/0373459 A1* | 12/2018 | Resch | .................... | G06F 3/0647 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 1511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

* cited by examiner

UNIDIRECTIONAL VAULT SYNCHRONIZATION TO SUPPORT TIERING

CROSS REFERENCE TO RELATED PATENTS

The present U.S. Utility patent application claims priority pursuant to 35 U.S.C. § 120 as a continuation-in-part (CIP) of U.S. Utility patent application Ser. No. 14/926,891, entitled "REDISTRIBUTING ENCODED DATA SLICES IN A DISPERSED STORAGE NETWORK," filed Oct. 29, 2015, pending, which claims priority pursuant to 35 U.S.C. § 119(e) to U.S. Provisional Application No. 62/098,414, entitled "SYNCHRONIZING UTILIZATION OF A PLURALITY OF DISPERSED STORAGE RESOURCES," filed Dec. 31, 2014, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Prior art data storage systems do not provide adequate means to provide acceptable operation and synchronization of data between various portions therein. For example, different respective portions of a prior art data storage system may include versions of similar or same data, and the prior art does not provide effective means to ensure synchronization of them while maintaining overall efficient system performance.

DETAILED DESCRIPTION OF THE INVENTION

Figure 1:
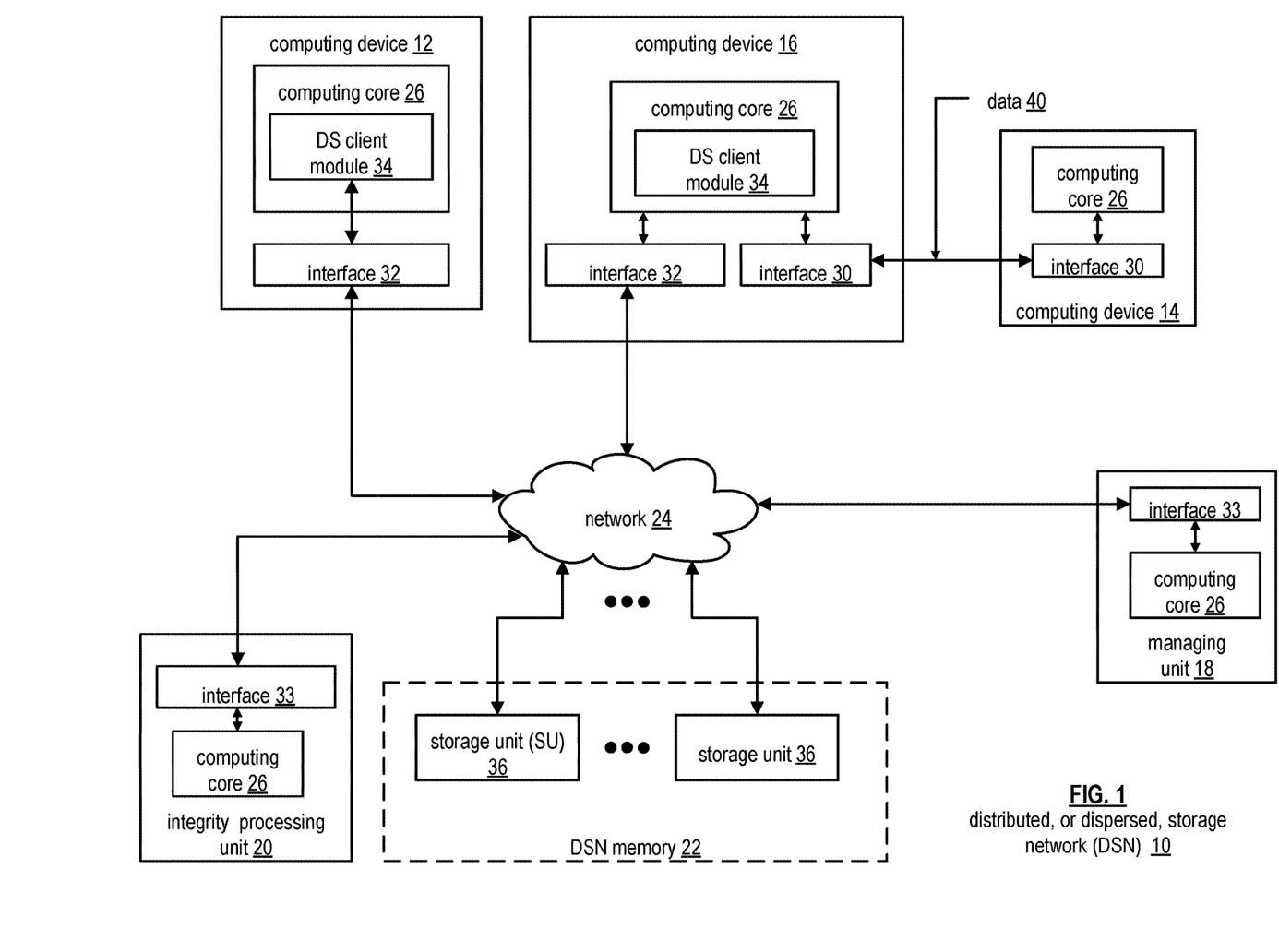
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
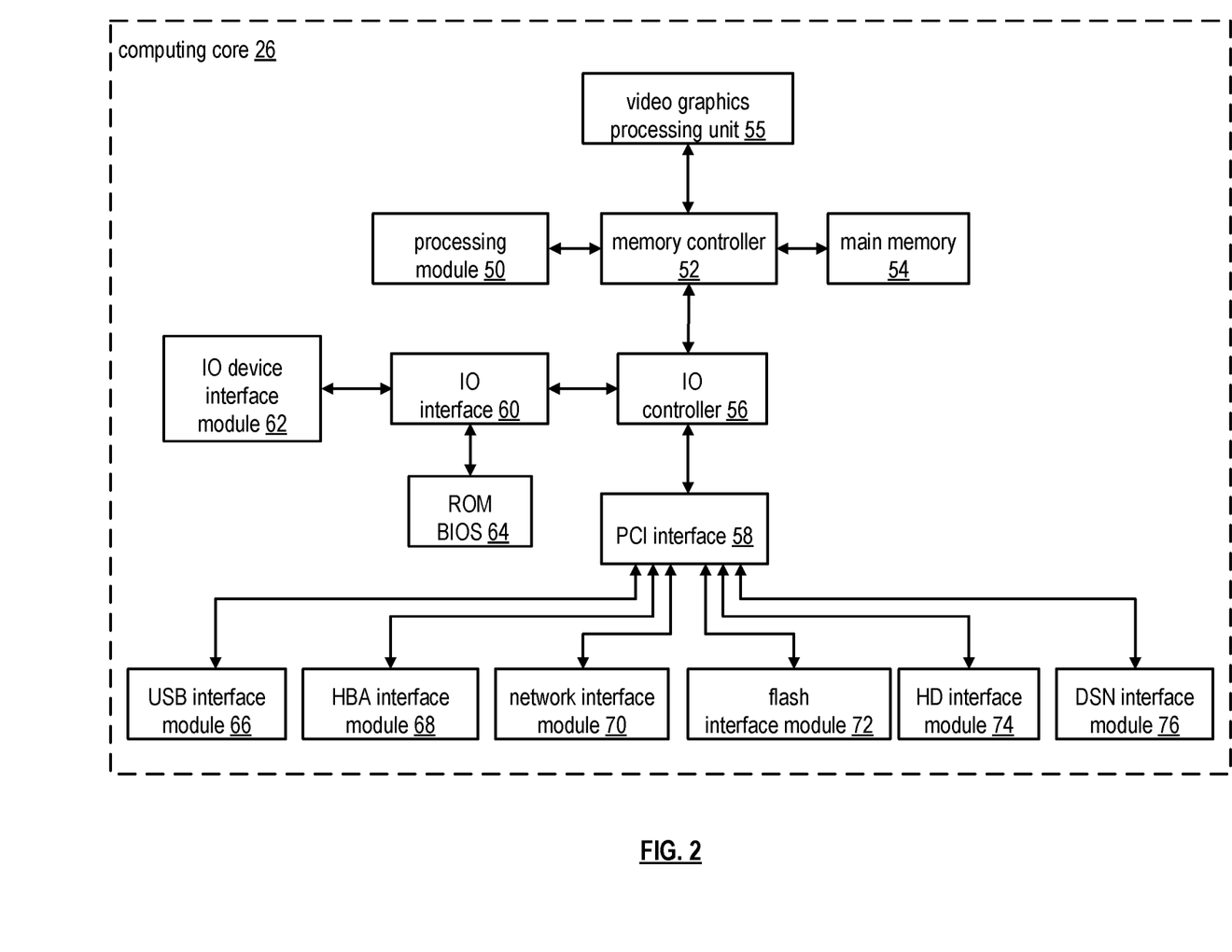
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
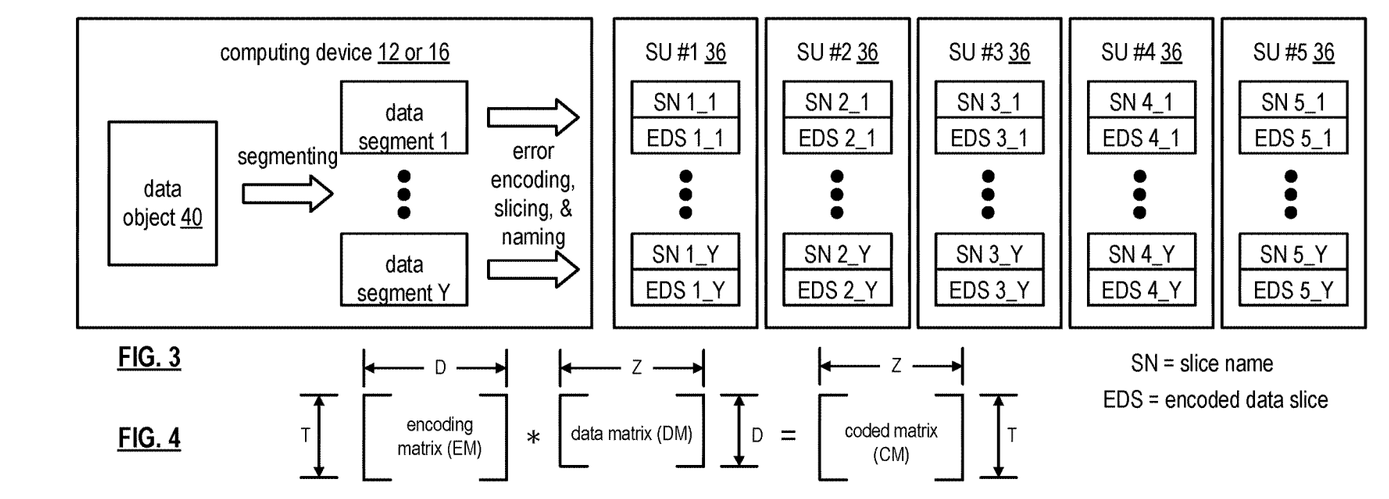
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figures 5, 6:
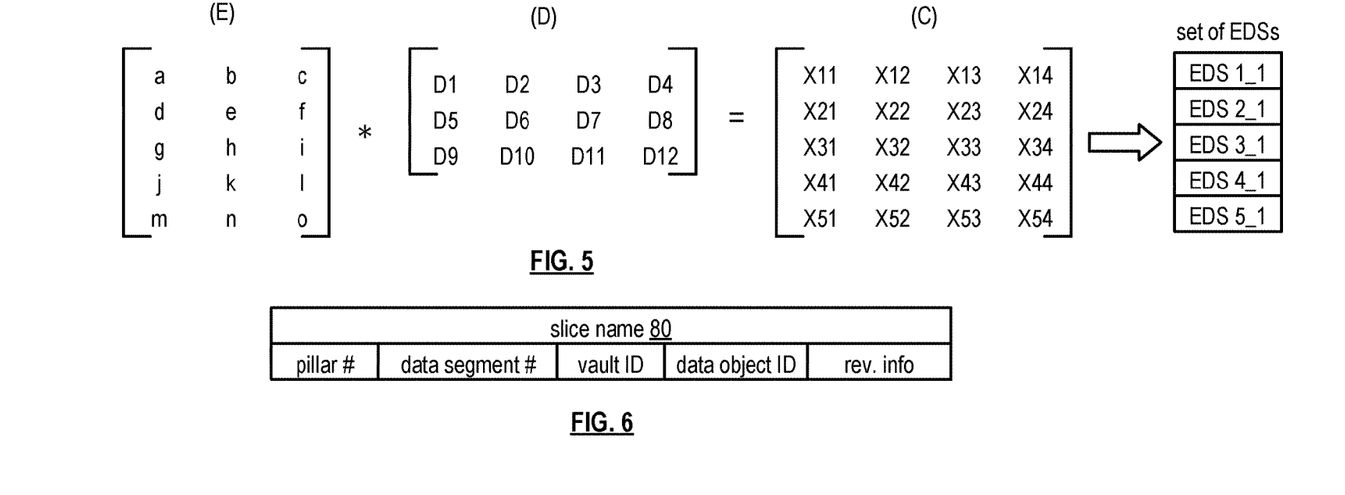
FIG. 5 is a schematic block diagram of a specific example of an error encoding function in accordance with the present invention.
FIG. 6 is a schematic block diagram of an example of a slice name of an encoded data slice (EDS) in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
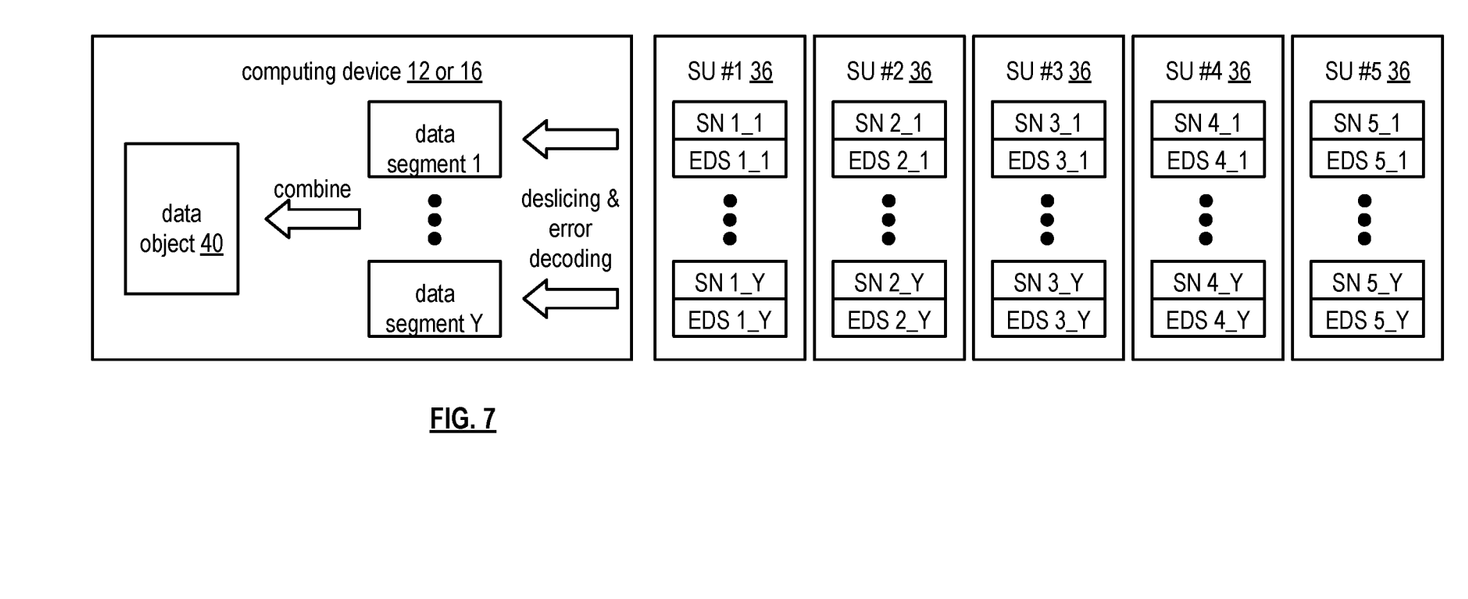
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
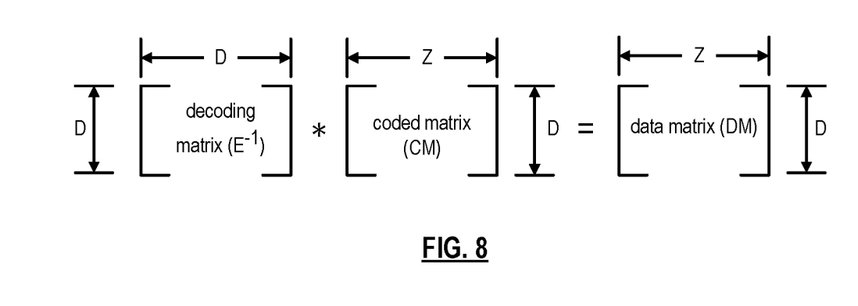
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In some examples, note that dispersed or distributed storage network (DSN) memory includes one or more of a plurality of storage units (SUs) such as SUs 36 (e.g., that may alternatively be referred to a distributed storage and/or task network (DSTN) module that includes a plurality of distributed storage and/or task (DST) execution units 36 that may be located at geographically different sites (e.g., one in Chicago, one in Milwaukee, etc.). Each of the SUs (e.g., alternatively referred to as DST execution units in some examples) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Figure 9:
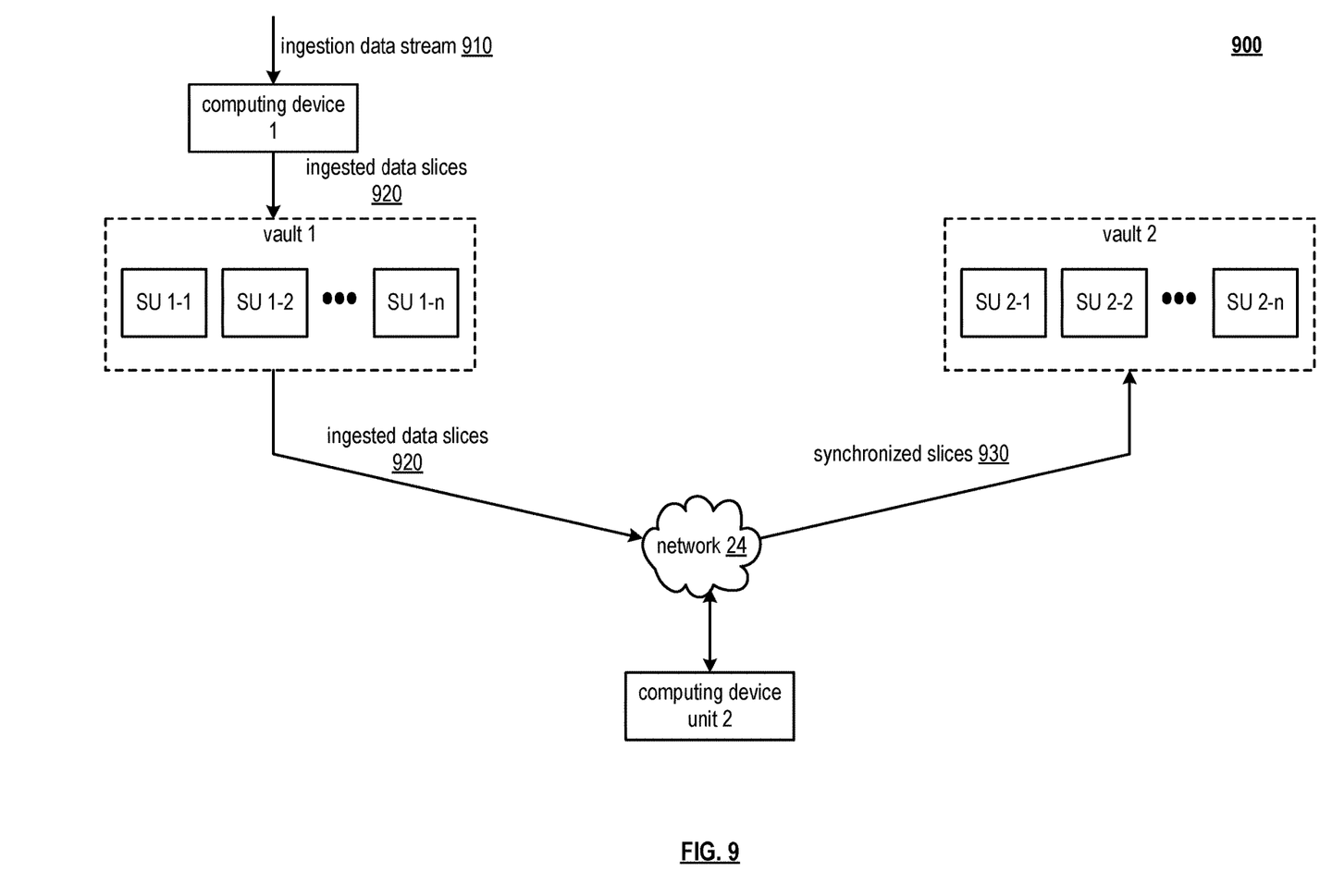
FIG. 9 is a schematic block diagram of an embodiment of a dispersed or distributed storage network (DSN) in accordance with the present invention.

FIG. 9 is a schematic block diagram of another embodiment of a dispersed or distributed storage network (DSN) in accordance with the present invention. This diagram includes is a schematic block diagram of another embodiment of a dispersed storage network (DSN) that includes at least two storage vaults, the network 24 of FIG. 1, and two computing devices 1-2. Each computing device may be implemented utilizing the computing device 16 of FIG. 1. Each storage vault includes a set of n storage units (SUs). For example, the storage vault 1 includes SUs 1-1 through 1-n and the storage vault 2 includes SUs 2-1 through 1-n. Alternatively, the at least two storage vaults may be implemented virtually within a single common set of SUs.

The DSN functions to ingest data for storage in one or more of the at least two storage vaults. In an example of operation of the ingesting of the data, the computing device 1 facilitates storage of an ingestion data stream 910 in the first storage vault, where the first storage vault is associated with favorable performance for data ingestion (e.g., fast storage, low access latency). The facilitating includes one or more of dispersed storage error encoding at least a portion of the ingestion data stream 910 to produce one or more sets of ingested data slices 920 and storing the one or more sets of ingested data slices 920 in the SUs of the first storage vault.

The computing device 2 selects storage parameters for a multi-vault synchronization process between the first storage vault and at least the second storage vault. For example, the computing device 2 selects the second storage vault and selects dispersal parameters for the second storage vault. The selecting may be based on one or more of a predetermination, interpreting system registry information for storage vault 2, and receiving the dispersal parameters.

Having selected the storage parameters, the computing device 2 synchronizes storage of ingested data slices 920 from the first storage vault to the second storage vault utilizing the selected storage parameters. For example, for a portion of a DSN address range corresponding to the selected data object, the computing device 2 recovers, via the network 24, at least a portion of the ingestion data stream 910 from the first vault (e.g., by receiving ingested data slices 920 and disperse storage error decoding the received ingested data slices 920 to produce a recovered portion of the ingestion data stream 910), re-encodes the portion of the ingestion data stream 910 utilizing the selected storage parameters to produce synchronized slices 930, and sends, via the network 24, the synchronized slices 930 to the storage vault 2 for storage.

Having synchronized the storage, the computing device 2 maintains storage of the portion of the ingestion stream within the at least the second vault and that within the first vault. For example, the computing device 2 facilitates deletion of the ingested data slices 920 corresponding to the portion of the ingestion stream from the first storage vault and indicates not to maintain further synchronization for the portion of the ingestion stream.

When further portions of the ingestion data stream 910 exists within the first storage vault, the computing device 2 selects another portion of the ingestion data stream 910 and repeats the multi-vault synchronization process. Alternatively, or in addition to, after deleting data from the first vault utilized for ingestion, the computing device 2 may move the portion of the data stream from the second vault to another recovery vault (e.g., one associated with high-speed access) to facilitate fast retrieval and many retrievals per unit of time. For example, the computing device 2 moves the portion of the ingested data stream from the second storage vault to the first storage vault. As another example, the computing device 2 moves the portion of the ingested data stream from the second storage vault to a third storage vault to support further retrieving of the portion of the ingested data stream.

In an example of operation and implementation, a computing device includes an interface configured to interface and communicate with a dispersed or distributed storage network (DSN), a memory that stores operational instructions, and a processing module, processor, and/or processing circuitry operably coupled to the interface and memory. The processing module, processor, and/or processing circuitry is configured to execute the operational instructions to perform various operations, functions, etc. In some examples, the processing module, processor, and/or processing circuitry, when operable within the computing device based on the operational instructions, is configured to perform various operations, functions, etc. In certain examples, the processing module, processor, and/or processing circuitry, when operable within the computing device is configured to perform one or more functions that may include generation of one or more signals, processing of one or more signals, receiving of one or more signals, transmission of one or more signals, interpreting of one or more signals, etc. and/or any other operations as described herein and/or their equivalents.

In an example of operation and implementation, a computing device (e.g., computing device 16 of FIG. 1, computing device 2 of FIG. 9, and/or any other diagram, example, embodiment, equivalent, etc. as described herein) is configured to select storage parameters for a multi-vault synchronization process from a first storage vault to a second storage vault. In some examples, the first storage vault includes a first plurality of storage units (SUs) within the DSN, and the second storage vault that includes a second plurality of SUs. Also, the first plurality of SUs distributedly stores one or more sets of ingestion encoded data slices (EDSs) that are generated based on dispersed error encoding of at least a portion of an ingestion data stream in accordance with first dispersed error encoding parameters. Also, a data object of the at least a portion of an ingestion data stream is segmented into a plurality of data segments, and a data segment of the plurality of data segments is dispersed error encoded in accordance with the first dispersed error encoding parameters to produce a set of ingestion EDSs of the one or more sets of ingestion EDSs. The computing device is also configured to select second dispersed error encoding parameters. The computing device is also configured to synchronize storage of the one or more sets of ingestion EDSs from the first storage vault to the second storage vault based on the second dispersed error encoding parameters. The computing device is also configured to maintain storage of the at least a portion of an ingestion data stream within the second storage vault. The computing device is also configured to facilitate deletion of the one or more sets of ingestion EDSs corresponding to the at least a portion of an ingestion data stream from the first storage vault. When the ingestion data stream includes at least one other portion, the computing device is also configured to perform another multi-vault synchronization process from the first storage vault to the second storage vault for the at least one other portion of the ingestion data stream.

In some examples, the computing device is also configured to select the second dispersed error encoding parameters based on a predetermination, an interpretation of a system registry information for the second storage vault, and/or receiving the second dispersed error encoding parameters.

In even examples, the computing device is also configured to synchronize the storage of the one or more sets of ingestion EDSs from the first storage vault to the second storage vault based on the second dispersed error encoding parameters based on recovery, via the DSN, of the at least a portion of an ingestion data stream from the first storage vault, re-encoding of the at least a portion of an ingestion data stream in accordance with the second dispersed error encoding parameters to produce synchronized EDSs, and transmission, via the DSN, of the synchronized EDSs to the second storage vault for storage therein.

Also, with respect to certain embodiments, examples, etc., another computing device (e.g., computing device 16 of FIG. 1, computing device 1 of FIG. 9, and/or any other diagram, example, embodiment, equivalent, etc. as described herein) in communication with the DSN is configured to produce the one or more sets of ingestion EDSs that are generated based on dispersed error encoding of the at least a portion of an ingestion data stream in accordance with first dispersed error encoding parameters.

In some examples, with respect to a data object, the data object is segmented into a plurality of data segments, and a data segment of the plurality of data segments is dispersed error encoded in accordance with dispersed error encoding parameters to produce a set of encoded data slices (EDSs) (e.g., in some instances, the set of EDSs are distributedly stored in a plurality of storage units (SUs) within the DSN). In some examples, the set of EDSs is of pillar width. Also, with respect to certain implementations, note that the decode threshold number of EDSs are needed to recover the data segment, and a read threshold number of EDSs provides for reconstruction of the data segment. Also, a write threshold number of EDSs provides for a successful transfer of the set of EDSs from a first at least one location in the DSN to a second at least one location in the DSN. The set of EDSs is of pillar width and includes a pillar number of EDSs. Also, in some examples, each of the decode threshold, the read threshold, and the write threshold is less than the pillar number. Also, in some particular examples, the write threshold number is greater than or equal to the read threshold number that is greater than or equal to the decode threshold number.

Note that the computing device as described herein may be located at a first premises that is remotely located from a second premises associated with at least one other SU, dispersed storage (DS) unit, computing device, at least one SU of a plurality of SUs within the DSN (e.g., such as a plurality of SUs that are implemented to store distributedly a set of EDSs), etc. In addition, note that such a computing device as described herein may be implemented as any of a number of different devices including a managing unit that is remotely located from another SU, DS unit, computing device, etc. within the DSN and/or other device within the DSN, an integrity processing unit that is remotely located from another computing device and/or other device within the DSN, a scheduling unit that is remotely located from another computing device and/or SU within the DSN, and/or other device. Also, note that such a computing device as described herein may be of any of a variety of types of devices as described herein and/or their equivalents including a DS unit and/or SU included within any group and/or set of DS units and/or SUs within the DSN, a wireless smart phone, a laptop, a tablet, a personal computers (PC), a work station, and/or a video game device, and/or any type of computing device or communication device. Also, note also that the DSN may be implemented to include and/or be based on any of a number of different types of communication systems including a wireless communication system, a wire lined communication system, a non-public intranet system, a public internet system, a local area network (LAN), and/or a wide area network (WAN). Also, in some examples, any device configured to support communications within such a DSN may be also be configured to and/or specifically implemented to support communications within a satellite communication system, a wireless communication system, a wired communication system, a fiber-optic communication system, and/or a mobile communication system (and/or any other type of communication system implemented using any type of communication medium or media).

Figure 10:
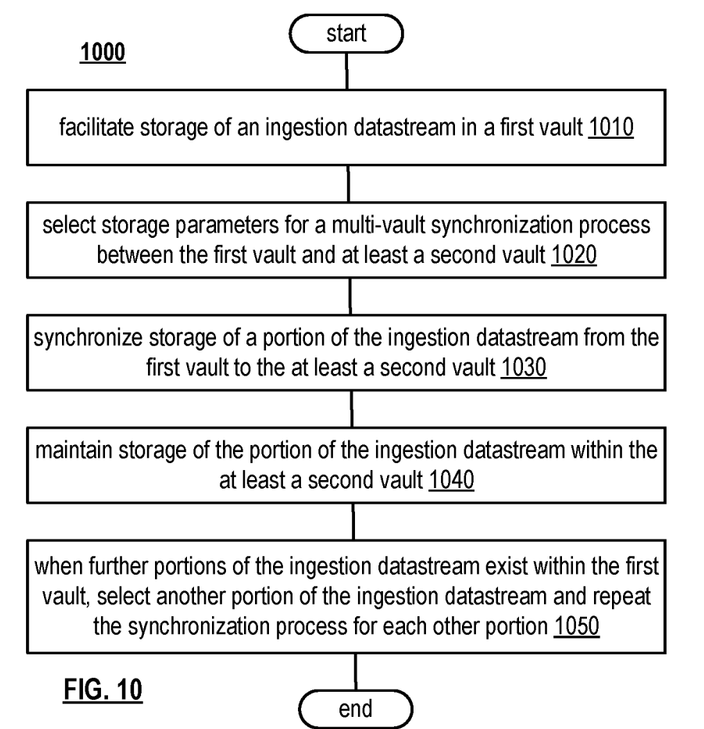
FIG. 10 is a flowchart illustrating an example of ingesting data for storage in accordance with the present invention.

FIG. 10 is a flowchart illustrating an example of ingesting data for storage in accordance with the present invention. This diagram includes is a flowchart illustrating an example of ingesting data for storage. The method 1000 begins or continues at a step 1010 where a processing module of one or more processing modules (e.g., of one or more distributed storage (DS) processing units and/or computing devices) facilitate storage of an ingestion data stream in a first storage vault. For example, the processing module dispersed storage error encodes the ingestion data stream utilizing ingestion dispersal parameters to produce ingestion data slices for storage in the first storage vault.

The method 1000 continues at the step 1020 where the processing module selects storage parameters for a multi-vault synchronization process between the first storage vault and at least a second storage vault. For example, the processing module chooses another vault including at least the second storage vault and selects dispersal parameters for each other storage vault.

The method 1000 continues at the step 1030 where the processing module initiates a synchronization process including synchronizing storage of a portion of the ingestion datastream from the first storage vault to the at least a second storage vault. For example, the processing module recovers the portion of the ingestion datastream from the first vault utilizing the ingestion dispersal parameters, dispersed storage error encodes the recovered portion of the ingestion datastream using selected storage parameters to produce synchronized slices, and facilitates storage of the synchronized slices in the at least a second storage vault.

The method 1000 continues at the step 1040 where the processing module maintains storage of the portion of the ingestion datastream within the at least a second storage vault. For example, the processing module facilitates deleting the ingestion data slices from the first storage vault and indicates not to maintain further synchronization for the portion of the ingestion datastream.

When further portions of the ingestion datastream exists within the first storage vault, the method 1000 continues at the step 1050 where the processing module selects another portion of the ingestion datastream and repeats the synchronization process for each other portion. For example, the processing module determines that another portion of the ingestion datastream exists within the first storage vault, identifies a next portion of the ingestion datastream as the other portion, recovers the next portion of the ingestion datastream for the first storage vault, selects storage parameters for the next portion, dispersed storage error encodes the recovered next portion to produce further synchronized slices, and facilitate storage of the further synchronized slices in the at least a second storage vault.

Alternatively, or in addition to, after deleting data from the first storage vault, the processing module may move the data from the second storage vault to a high-speed recovery storage vault to facilitate fast retrieval and/or many retrievals per unit of time. For example, the processing module facilitates moving the data back to the first storage vault. As another example, the processing module facilitates moving the data to another storage vault associated with fast retrieval.

Figure 11:
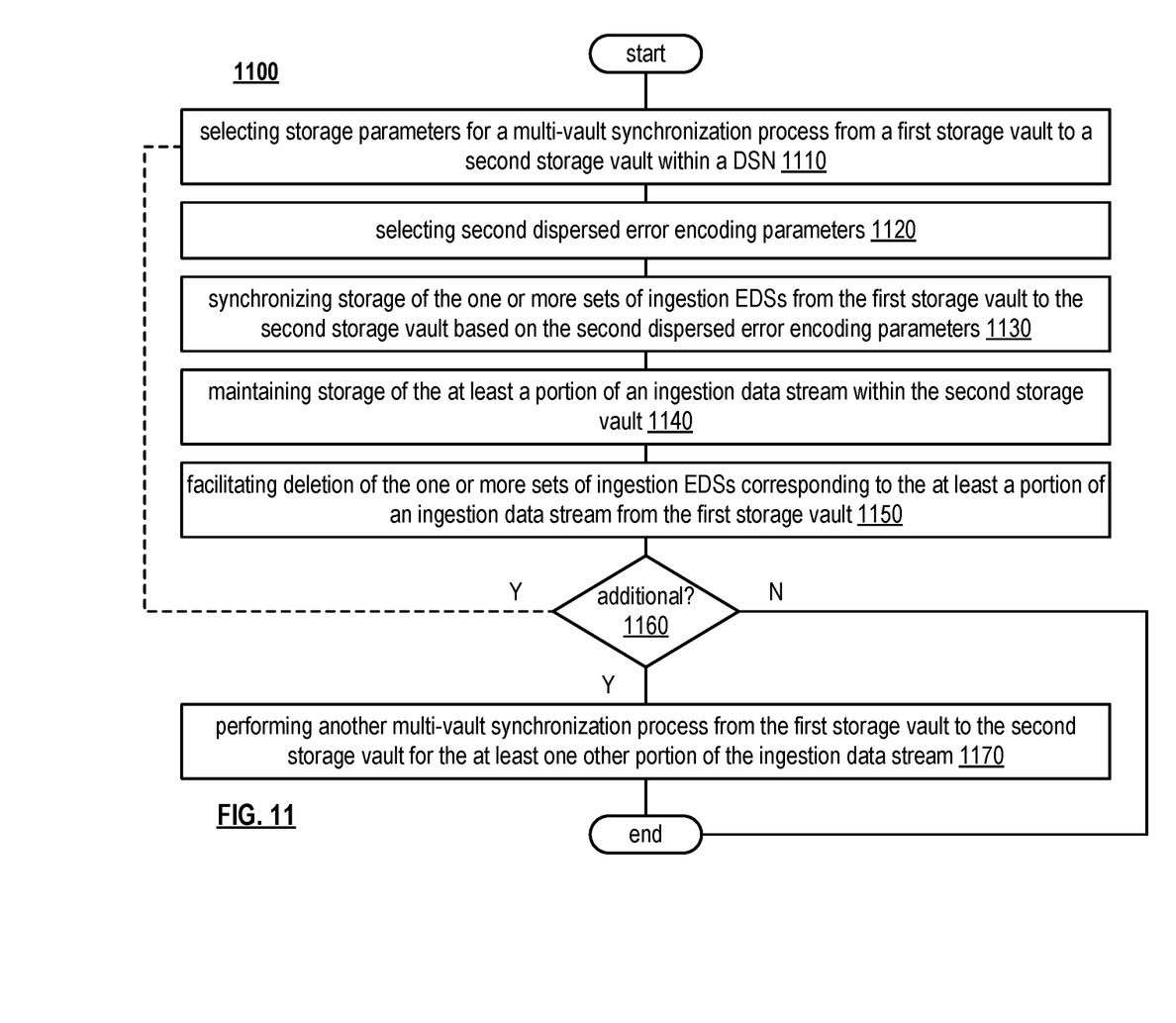
FIG. 11 is a diagram illustrating an embodiment of a method for execution by one or more computing devices in accordance with the present invention.

FIG. 11 is a diagram illustrating an embodiment of a method 1100 for execution by one or more computing devices in accordance with the present invention. The method 1100 operates in step 1110 by selecting storage parameters for a multi-vault synchronization process from a first storage vault to a second storage vault within a dispersed or distributed storage network (DSN). In some examples, the first storage vault includes a first plurality of storage units (SUs), and the second storage vault that includes a second plurality of SUs. Also, in certain examples, the first plurality of SUs distributedly stores one or more sets of ingestion encoded data slices (EDSs) that are generated based on dispersed error encoding of at least a portion of an ingestion data stream in accordance with first dispersed error encoding parameters. Note that a data object of the at least a portion of an ingestion data stream is segmented into a plurality of data segments, and a data segment of the plurality of data segments is dispersed error encoded in accordance with the first dispersed error encoding parameters to produce a set of ingestion EDSs of the one or more sets of ingestion EDSs.

The method 1100 then continues in step 1120 by selecting second dispersed error encoding parameters. The method 1100 operates in step 1130 by synchronizing (e.g., via an interface of the computing device that is configured to interface and communicate with a DSN), storage of the one or more sets of ingestion EDSs from the first storage vault to the second storage vault based on the second dispersed error encoding parameters.

The method 1100 then continues in step 1140 by maintaining storage of the at least a portion of an ingestion data stream within the second storage vault. The method 1100 then operates in step 1150 by facilitating (e.g., via the interface) deletion of the one or more sets of ingestion EDSs corresponding to the at least a portion of an ingestion data stream from the first storage vault.

When the ingestion data stream includes at least one other portion (as determined by step 1160), the method 1100 branches in a first yes path to step 1170 and operates by performing another multi-vault synchronization process from the first storage vault to the second storage vault for the at least one other portion of the ingestion data stream. Alternatively, when the ingestion data stream includes at least one other portion (as determined by step 1160), the method 1100 branches back in a second yes path to step 1110 and performs steps similar to 1110-1150 for the at least one other portion of the ingestion data stream (and may perform multiple loops for each of the multiple respective other portion of the ingestion data stream).

Alternatively, when the ingestion data stream does not include at least one other portion (as determined by step 1160), the method 1100 branches in a no path and ends.

This disclosure presents, among other things, various novel solutions that operate and provide for unidirectional vault synchronization to support tiering. For example, vault synchronization agents may be slightly amended to implement tiering between different DSN memories or vaults. For example, in a case between a local low-latency vault, and a geo-dispersed high-latency vault, high input/output operations per second (IOPS) or latency sensitive entities may choose to access the vault that is local to or closest to them. Meanwhile, the chances they implement will be synchronized "off-line" by the synchronization agents. In the event that all data is ingested at for specific vaults but not others, then the concept of "unidirectional synchronization" may be applied, in which synchronization agents will only write updated versions of an object into the vaults that are not used for ingest. Given that the data is not migrated back towards these ingest vaults, the synchronization agents may further opt to delete the object from the ingest vault(s), once it has been synchronized to the vaults not used for ingesting data. In this way, small (low storage capacity), fast, local, and low latency vaults may be used for ingesting data or for operating on data for a limited period after it is written. When it becomes "cold", however, its local instances may be freed to make more room for new "hot" data, while the cold data is synchronized to its permanent resting place (other vaults). The vaults used for ingest, being of lower capacity, may also optimize for TOPS, throughput, and other such operations, while the non-ingest vault(s) may optimize for low power consumption, high capacity, or low cost, among other factors. As an additional enhancement to support faster reads in the event a cold object becomes hot again, the computing device may, when provided a read request, always attempt to read from the local vault first, and if not found attempt the read in the cold-storage vaults. Then, when an object is requested for reads (or requested with a high enough frequency) the computing device may violate the unidirectional synchronization to store the object in the local vault (where it may remain at least temporarily).

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
an interface configured to interface and communicate with a dispersed or distributed storage network (DSN);
memory that stores operational instructions; and
processing circuitry operably coupled to the interface and to the memory, wherein the processing circuitry is configured to execute the operational instructions to:
select storage parameters for a multi-vault synchronization process from a first storage vault to a second storage vault, wherein the first storage vault includes a first plurality of storage units (SUs) within the DSN, wherein the second storage vault that includes a second plurality of SUs, wherein the first plurality of SUs distributedly stores one or more sets of ingestion encoded data slices (EDSs) that are generated, by a client module based on dispersed error encoding of at least a portion of an ingestion data stream in accordance with first dispersed error encoding parameters, wherein a data object of the at least a portion of an ingestion data stream is segmented into a plurality of data segments, wherein a data segment of the plurality of data segments is dispersed error encoded in accordance with the first dispersed error encoding parameters to produce a set of ingestion EDSs of the one or more sets of ingestion EDSs, wherein the second storage vault is not used for ingestion of encoded data slices generated by the client module;
select second dispersed error encoding parameters;
synchronize storage of the one or more sets of ingestion EDSs from the first storage vault to the second storage vault based on the second dispersed error encoding parameters;
in accordance with synchronization of the storage of the one or more sets of ingestion EDSs, maintain storage of the at least a portion of an ingestion data stream within the second storage vault and also within the first storage vault;
facilitate deletion of the one or more sets of ingestion EDSs corresponding to the at least a portion of an ingestion data stream from the first storage vault;
based on deletion of the one or more sets of ingestion EDSs corresponding to the at least a portion of an ingestion data stream from the first storage vault, provide an indication to not maintain further synchronization of the at least a portion of an ingestion data stream;
return the at least a portion of an ingestion data stream from the second storage vault to the first storage vault, wherein the first storage vault facilitates faster retrieval therefrom than the second storage vault; and
based on the ingestion data stream including at least one other portion, perform another multi-vault synchronization process from the first storage vault to the second storage vault for the at least one other portion of the ingestion data stream.

2. The computing device of claim 1, wherein the processing circuitry is further configured to execute the operational instructions to:
select the second dispersed error encoding parameters based on at least one of a predetermination, an interpretation of a system registry information for the second storage vault, or receiving the second dispersed error encoding parameters.

3. The computing device of claim 1, wherein the processing circuitry is further configured to execute the operational instructions to:
synchronize the storage of the one or more sets of ingestion EDSs from the first storage vault to the second storage vault based on the second dispersed error encoding parameters based on recovery, via the DSN, of the at least a portion of an ingestion data stream from the first storage vault, re-encoding of the at least a portion of an ingestion data stream in accordance with the second dispersed error encoding parameters to produce synchronized EDSs, and transmit, via the DSN, of the synchronized EDSs to the second storage vault for storage therein.

4. The computing device of claim 1 further comprising:
another computing device in communication with the DSN and that is configured to produce the one or more sets of ingestion EDSs that are generated based on dispersed error encoding of the at least a portion of an ingestion data stream in accordance with first dispersed error encoding parameters.

5. The computing device of claim 1, wherein:
a decode threshold number of EDSs are needed to recover the data segment;
a read threshold number of EDSs provides for reconstruction of the data segment;
a write threshold number of EDSs provides for a successful transfer of the set of EDSs from a first at least one location in the DSN to a second at least one location in the DSN;
the set of EDSs is of pillar width and includes a pillar number of EDSs;
each of the decode threshold number, the read threshold number, and the write threshold number is less than the pillar number; and
the write threshold number is greater than or equal to the read threshold number that is greater than or equal to the decode threshold number.

6. The computing device of claim 1, wherein the computing device is located at a first premises that is remotely located from a second premises of at least one SU of the first plurality of SUs or the second plurality of SUs within the DSN.

7. The computing device of claim 1 further comprising:
a SU of the first plurality of SUs or the second plurality of SUs within the DSN, a wireless smart phone, a laptop, a tablet, a personal computers (PC), a work station, or a video game device.

8. The computing device of claim 1, wherein the DSN includes at least one of a wireless communication system, a wire lined communication system, a non-public intranet system, a public internet system, a local area network (LAN), or a wide area network (WAN).

9. A computing device comprising:
an interface configured to interface and communicate with a dispersed or distributed storage network (DSN);
memory that stores operational instructions; and
processing circuitry operably coupled to the interface and to the memory, wherein the processing circuitry is configured to execute the operational instructions to:
  select storage parameters for a multi-vault synchronization process from a first storage vault to a second storage vault, wherein the first storage vault includes a first plurality of storage units (SUs) within the DSN, wherein the second storage vault that includes a second plurality of SUs, wherein the first plurality of SUs distributedly stores one or more sets of ingestion encoded data slices (EDSs) that are generated, by a client module based on dispersed error encoding of at least a portion of an ingestion data stream in accordance with first dispersed error encoding parameters, wherein a data object of the at least a portion of an ingestion data stream is segmented into a plurality of data segments, wherein a data segment of the plurality of data segments is dispersed error encoded in accordance with the first dispersed error encoding parameters to produce a set of ingestion EDSs of the one or more sets of ingestion EDSs, wherein the second storage vault is not used for ingestion of encoded data slices generated by the client module;
  select second dispersed error encoding parameters based on at least one of a predetermination, an interpretation of a system registry information for the second storage vault, or receiving the second dispersed error encoding parameters;
  synchronize storage of the one or more sets of ingestion EDSs from the first storage vault to the second storage vault based on the second dispersed error encoding parameters based on recovery, via the DSN, of the at least a portion of an ingestion data stream from the first storage vault, re-encoding of the at least a portion of an ingestion data stream in accordance with the second dispersed error encoding parameters to produce synchronized EDSs, and transmit, via the DSN, of the synchronized EDSs to the second storage vault for storage therein;
  in accordance with synchronization of the storage of the one or more sets of ingestion EDSs, maintain storage of the at least a portion of an ingestion data stream within the second storage vault and also within the first storage vault;
  facilitate deletion of the one or more sets of ingestion EDSs corresponding to the at least a portion of an ingestion data stream from the first storage vault;
  based on deletion of the one or more sets of ingestion EDSs corresponding to the at least a portion of an ingestion data stream from the first storage vault, provide an indication not to maintain further synchronization of the at least a portion of an ingestion data stream;
  return the at least a portion of an ingestion data stream from the second storage vault to the first storage vault, wherein the first storage vault facilitates faster retrieval therefrom than the second storage vault; and
  based on the ingestion data stream including at least one other portion, perform another multi-vault synchronization process from the first storage vault to the second storage vault for the at least one other portion of the ingestion data stream.

10. The computing device of claim 9 further comprising:
another computing device in communication with the DSN and that is configured to produce the one or more sets of ingestion EDSs that are generated based on dispersed error encoding of the at least a portion of an ingestion data stream in accordance with first dispersed error encoding parameters.

11. The computing device of claim 9, wherein:
a decode threshold number of EDSs are needed to recover the data segment;
a read threshold number of EDSs provides for reconstruction of the data segment;
a write threshold number of EDSs provides for a successful transfer of the set of EDSs from a first at least one location in the DSN to a second at least one location in the DSN;
the set of EDSs is of pillar width and includes a pillar number of EDSs;
each of the decode threshold number, the read threshold number, and the write threshold number is less than the pillar number; and
the write threshold number is greater than or equal to the read threshold number that is greater than or equal to the decode threshold number.

12. The computing device of claim 9 further comprising:
a SU of the first plurality of SUs or the second plurality of SUs within the DSN, a wireless smart phone, a laptop, a tablet, a personal computers (PC), a work station, or a video game device.

13. The computing device of claim 9, wherein the DSN includes at least one of a wireless communication system, a wire lined communication system, a non-public intranet system, a public internet system, a local area network (LAN), or a wide area network (WAN).

14. A method for execution by a computing device, the method comprising:
  selecting storage parameters for a multi-vault synchronization process from a first storage vault to a second storage vault within a dispersed or distributed storage network (DSN), wherein the first storage vault includes a first plurality of storage units (SUs), wherein the second storage vault that includes a second plurality of SUs, wherein the first plurality of SUs distributedly stores one or more sets of ingestion encoded data slices (EDSs) that are generated by a client module based on dispersed error encoding of at least a portion of an ingestion data stream in accordance with first dispersed error encoding parameters, wherein a data object of the at least a portion of an ingestion data stream is segmented into a plurality of data segments, wherein a data segment of the plurality of data segments is dispersed error encoded in accordance with the first dispersed error encoding parameters to produce a set of ingestion EDSs of the one or more sets of ingestion EDSs, wherein the second storage vault is not used for ingestion of encoded data slices generated by the client module;
  selecting second dispersed error encoding parameters;
  synchronizing, via an interface of the computing device that is configured to interface and communicate with the DSN, storage of the one or more sets of ingestion EDSs from the first storage vault to the second storage vault based on the second dispersed error encoding parameters;

in accordance with synchronization of the storage of the one or more sets of ingestion EDSs, maintaining storage of the at least a portion of an ingestion data stream within the second storage vault and also within the first storage vault;

facilitating, via the interface, deletion of the one or more sets of ingestion EDSs corresponding to the at least a portion of an ingestion data stream from the first storage vault;

based on deletion of the one or more sets of ingestion EDSs corresponding to the at least a portion of an ingestion data stream from the first storage vault, providing an indication not to maintain further synchronization of the at least a portion of an ingestion data stream;

returning, via the interface, the at least a portion of an ingestion data stream from the second storage vault to the first storage vault, wherein the first storage vault facilitates faster retrieval therefrom than the second storage vault; and based on the ingestion data stream including at least one other portion, performing another multi-vault synchronization process from the first storage vault to the second storage vault for the at least one other portion of the ingestion data stream.

15. The method of claim 14 further comprising:
selecting the second dispersed error encoding parameters based on at least one of a predetermination, an interpretation of a system registry information for the second storage vault, or receiving the second dispersed error encoding parameters.

16. The method of claim 14 further comprising:
synchronizing the storage of the one or more sets of ingestion EDSs from the first storage vault to the second storage vault based on the second dispersed error encoding parameters based on recovery, via the DSN, of the at least a portion of an ingestion data stream from the first storage vault, re-encoding of the at least a portion of an ingestion data stream in accordance with the second dispersed error encoding parameters to produce synchronized EDSs, and transmitting, via the DSN, of the synchronized EDSs to the second storage vault for storage therein.

17. The method of claim 14, wherein:
a decode threshold number of EDSs are needed to recover the data segment;
a read threshold number of EDSs provides for reconstruction of the data segment;
a write threshold number of EDSs provides for a successful transfer of the set of EDSs from a first at least one location in the DSN to a second at least one location in the DSN;
the set of EDSs is of pillar width and includes a pillar number of EDSs;
each of the decode threshold number, the read threshold number, and the write threshold number is less than the pillar number; and
the write threshold number is greater than or equal to the read threshold number that is greater than or equal to the decode threshold number.

18. The method of claim 14, wherein the computing device is located at a first premises that is remotely located from a second premises of at least one SU of the first plurality of SUs or the second plurality of SUs within the DSN.

19. The method of claim 14, wherein the computing device includes a SU of the first plurality of SUs or the second plurality of SUs within the DSN, a wireless smart phone, a laptop, a tablet, a personal computers (PC), a work station, or a video game device.

20. The method of claim 14, wherein the DSN includes at least one of a wireless communication system, a wire lined communication system, a non-public intranet system, a public internet system, a local area network (LAN), or a wide area network (WAN).

* * * * *